United States Patent
Knoll et al.

(10) Patent No.: US 11,821,158 B2
(45) Date of Patent: Nov. 21, 2023

(54) AUTONOMOUS MODULAR BREAKWATER SYSTEM

(71) Applicant: X Development LLC, Mountain View, CA (US)

(72) Inventors: Matthew Aaron Knoll, Mountain View, CA (US); Neil Davé, San Mateo, CA (US); Charles Nordstrom, Berkeley, CA (US)

(73) Assignee: X Development LLC, Mountain View, CA (US)

( * ) Notice: Subject to any disclaimer, the term of this patent is extended or adjusted under 35 U.S.C. 154(b) by 1 day.

(21) Appl. No.: 17/373,283

(22) Filed: Jul. 12, 2021

(65) Prior Publication Data

US 2023/0011713 A1 Jan. 12, 2023

(51) Int. Cl.
*E02B 3/06* (2006.01)

(52) U.S. Cl.
CPC .................... *E02B 3/062* (2013.01)

(58) Field of Classification Search
CPC ......... E02B 3/062; Y02A 10/11; A01K 61/60; B63B 1/107
See application file for complete search history.

(56) References Cited

U.S. PATENT DOCUMENTS 7,003,947 B2 * 2/2006 Kanki ...................... F03B 13/18
60/497
7,320,289 B1 1/2008 Clarke et al.
(Continued)

FOREIGN PATENT DOCUMENTS

CL 2019000039 A1 3/2019
CN 108040948 5/2018
(Continued)

OTHER PUBLICATIONS

Maloy et al.. "A spatio-temporal recurrent network for salmon feeding action recognition from underwater videos in aquaculture," Computers and Electronics in Agriculture, Nov. 12, 2019, 9 pages.
(Continued)

*Primary Examiner* — Carib A Oquendo
(74) *Attorney, Agent, or Firm* — Fish & Richardson P.C.

(57) ABSTRACT

Methods, systems, and computer-readable media that implement an autonomous modular breakwater system. An example system includes a plurality of autonomous submersible structures, each configured to mechanically link to any other of the plurality of autonomous submersible structures to form a breakwater. The system includes a controller configured to perform operations including: determining a location for construction of a breakwater; determining an initial location of each of the plurality of autonomous submersible structures; selecting, based at least in part on the initial location of each of the plurality of autonomous submersible structures, a subset of the plurality of autonomous submersible structures for constructing the breakwater; and transmitting, to each of the selected autonomous submersible structures, instructions to transit from the respective initial location to the location for construction of the breakwater and to mechanically couple to at least one other autonomous submersible structure to form the breakwater.

19 Claims, 7 Drawing Sheets

(56) References Cited

U.S. PATENT DOCUMENTS

| | | | |
|---|---|---|---|
| 7,762,205 | B1 | 7/2010 | Veazey |
| 8,028,660 | B2 * | 10/2011 | Troy ...................... A01K 61/10 |
| | | | 119/223 |
| 8,102,071 | B2 | 1/2012 | Caitlin |
| 8,251,612 | B2 * | 8/2012 | Hartman ............. F03B 13/1845 |
| | | | 405/64 |
| 8,256,988 | B1 | 9/2012 | Haber |
| 8,398,334 | B1 * | 3/2013 | Doyle ..................... E02B 15/04 |
| | | | 405/64 |
| 8,614,520 | B2 | 12/2013 | Rohrer |
| 9,260,831 | B2 * | 2/2016 | Poscich .................... E02B 3/06 |
| 9,416,510 | B2 * | 8/2016 | Stratton .................. E02D 27/50 |
| 9,624,900 | B2 | 4/2017 | Phillips et al. |
| 9,655,347 | B2 * | 5/2017 | Troy ...................... A01K 61/65 |
| 9,739,023 | B2 * | 8/2017 | Shany ................. E02B 15/0878 |
| 9,797,386 | B2 | 10/2017 | Cole et al. |
| 10,190,568 | B2 | 1/2019 | Gregory |
| 10,191,489 | B1 * | 1/2019 | Rapoport ............ G05D 1/0692 |
| 10,856,520 | B1 | 12/2020 | Kozachenok et al. |
| 2011/0187102 | A1 | 8/2011 | Sirseth |
| 2013/0099496 | A1 | 4/2013 | Solheim |
| 2015/0082785 | A1 | 3/2015 | Rohrer |
| 2016/0007577 | A1 | 1/2016 | Constantz |
| 2017/0150701 | A1 | 6/2017 | Gilmore et al. |
| 2019/0135384 | A1 | 5/2019 | Teppig et al. |
| 2019/0228218 | A1 | 7/2019 | Barnaby et al. |
| 2019/0340440 | A1 | 11/2019 | Atwater et al. |
| 2020/0107524 | A1 | 4/2020 | Messana et al. |
| 2020/0155882 | A1 | 5/2020 | Tohidi et al. |
| 2020/0288678 | A1 | 9/2020 | Howe et al. |

FOREIGN PATENT DOCUMENTS

| | | |
|---|---|---|
| CN | 111391983 | 7/2020 |
| CN | 112127318 | 12/2020 |
| EP | 2244934 | 11/2010 |
| EP | 3484283 | 5/2019 |
| EP | 3973771 A1 * | 3/2022 |
| JP | 2002171853 | 6/2002 |
| KR | 20160032410 | 3/2016 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2014/179482 | 11/2014 |
| WO | WO2017137896 | 8/2017 |
| WO | WO 2018/011744 | 1/2018 |
| WO | WO2018011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

Odey, "AquaMesh—Design and Implementation of Smart Wireless Mesh Sensor Networks for Aquaculture," American Journal of Networks and Communications, Jul. 2013, 8 pages.

Petrov et al., "Overview of the application of computer vision technology in fish farming." E3S Web of Conferences, 2020, 175:02015.

Saberloon et al., "Application of Machine Vision Systems in Aquaculture with Emphasis on Fish: State-of-the-Art and Key Issues." Reviews in Aquaculture, Dec. 2017, 9:369-387.

towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.

Wang, "Robust tracking of fish schools using CNN for head identification," Multimedia Tools and Applications, Nov. 2017, 20 pages.

www.waterstudio.nl [online], "Parthenon, The Floating Sea Wall," Jun. 23, 2017, retrieved on July 2, 2021, retrieved from URL<https://www.waterstudio.nl/parthenon-the-floating-sea-wall/>, 4 pages.

Extended Search Report in European Appln. No. 22151132.2, dated May 2, 2022, 10 pages.

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln No. PCT/US2022/023831, dated Jul. 8, 2022, 13 pages.

International Search Report and Written Opinion in International Appln. No. PCT/US2020/059829, dated Feb. 25, 2021, 18 pages.

Invitation to Pay Additional Fees in International Appln. No. PCT/US2022/032628, dated Nov. 10, 2022, 13 pages.

Meidell et al., "FishNet: A Unified Embedding for Salmon Recognition," Thesis for Master's degree in Artificial Intelligence, Norwegian University of Science and Technology, Jun. 2019, 86 pages.

Moskvyak et al., "Robust Re-identification of Manta Rays from Natural Markings by Learning Pose Invariant Embeddings," CoRR, Feb. 2019, arXiv: 1902.10847v1, 12 pages.

Qiu et al., "Improving Transfer Learning and Squeeze-and-Excitation Networks for Small-Scale Fine-Grained Fish Image Classification," IEEE Access, Dec. 2018, 6(31):78503-78512.

Stein et al., "Consistent melanophore spot patterns allow long-term individual recognition of Atlantic salmon Salmo Salar," Journal of Fish Biology, Nov. 2017, 91(6):1699-1712.

International Search Report and Written Opinion in International Appln. No. PCT/US2022/032628, dated Jan. 31, 2023, 20 pages.

* cited by examiner

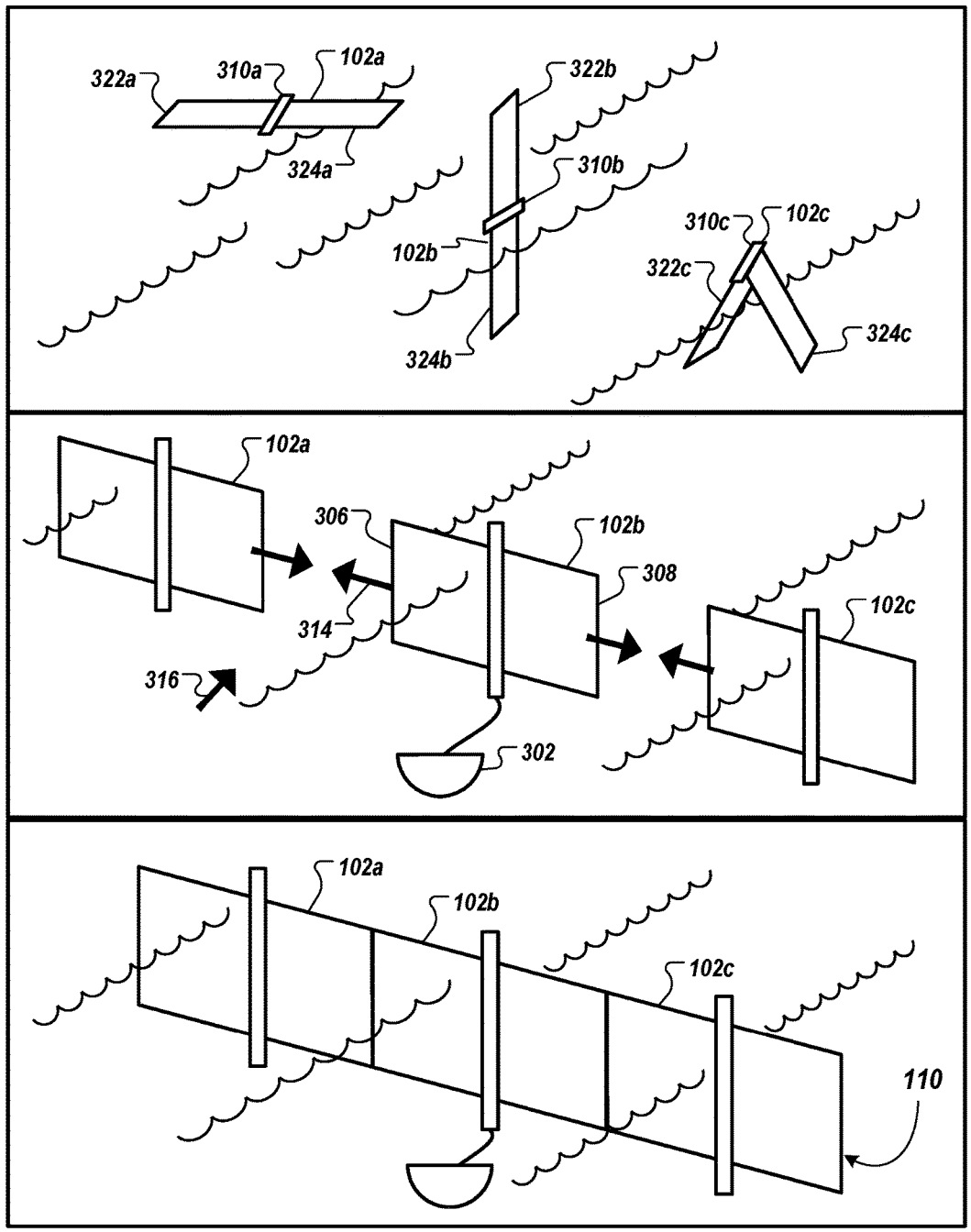

AUTONOMOUS MODULAR BREAKWATER SYSTEM

FIELD

This specification relates to control systems for breakwater systems.

BACKGROUND

Breakwaters are structures constructed near the coasts as part of coastal management or to protect an anchorage from the effects of both weather and longshore drift. Breakwaters can be used to reduce the intensity of wave action in inshore waters and thereby provide safe harborage. A breakwater structure is designed to absorb the energy of the waves that hit the structure, for example by using mass or by using a revetment slope.

SUMMARY

This specification describes techniques, methods, systems, and other approaches for constructing and deconstructing an autonomous modular breakwater system. The autonomous modular breakwater system is a system for dynamically constructing and modifying artificial breakwaters, or sea walls, by detecting and rearranging floating, mobile structures.

The disclosed systems include a controller for tracking and controlling multiple autonomous submersible structures. Each autonomous submersible structure can include control systems for autonomous maneuvering and navigation through bodies of water. The controller determines a location for constructing a breakwater, e.g., based on predicted weather events. The controller can then transmit instructions to autonomous submersible structures that cause the structures to transit to a destination location for constructing a modular breakwater. Upon arrival at the destination location, the autonomous submersible structures autonomously link with one another to form the breakwater. When the structures assemble to form a breakwater, the breakwater can attenuate incident waves. The breakwater can protect shorelines from wave activity, e.g., that is caused by a weather event such as a hurricane.

Among other advantages, implementations may improve availability of breakwaters in locations where permanent breakwaters are not installed. The autonomous modular breakwater system can construct, deconstruct, and reconstruct breakwaters when and where they are needed. The autonomous modular breakwater system can construct breakwaters of various sizes, shapes, and orientations. The autonomous modular breakwater system can also improve the ability to perform preventative and corrective maintenance on individual sections of a breakwater. Individual modular structures can be removed and replaced within a breakwater. The modular structures can autonomously navigate, e.g., to transit to a maintenance facility when maintenance is required. When the autonomous submersible structures are not in use as a breakwater, the autonomous submersible structures can be used for other purposes, e.g., as platforms for growing marine life.

In general, innovative aspects of the subject matter described in this specification can be embodied in a system including a plurality of autonomous submersible structures. Each of the autonomous submersible structures can be configured to mechanically link to any other of the plurality of autonomous submersible structures to form a breakwater. The system can include a controller configured to perform operations including: determining a location for construction of a breakwater; determining an initial location of each of the plurality of autonomous submersible structures; selecting, based at least in part on the initial location of each of the plurality of autonomous submersible structures, a subset of the plurality of autonomous submersible structures for constructing the breakwater; and transmitting, to each of the selected autonomous submersible structures, instructions to transit from the respective initial location to the location for construction of the breakwater and to mechanically couple to at least one other autonomous submersible structure to form the breakwater.

In general, other innovative aspects of the subject matter described in this specification can be embodied in an autonomous submersible structure including: a maneuvering system configured to propel the autonomous submersible structure and to configure the autonomous submersible structure in at least two configurations, the at least two configurations including: a water transit configuration; and a breakwater configuration; a control system configured to perform operations including controlling the maneuvering system to: propel the autonomous submersible structure to a location while the autonomous submersible structure is in the water transit configuration; and change the configuration of the autonomous submersible structure from the water transit configuration to the breakwater configuration.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 3A-3C are diagrams showing configurations of structures of an autonomous modular breakwater system.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
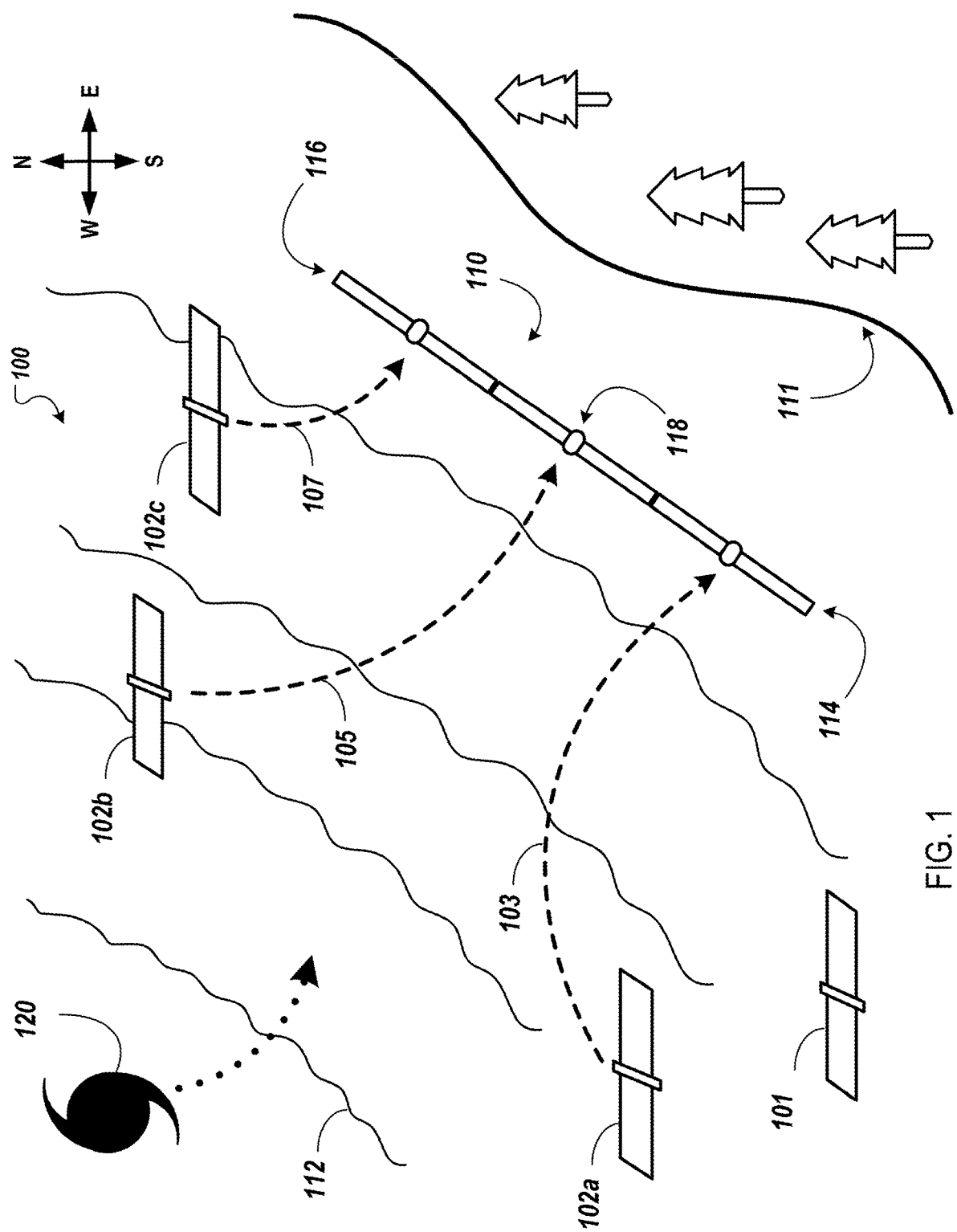
FIG. 1 is a diagram of an example system of autonomous submersible structures that are configured to assemble to form a breakwater.

FIG. 1 is a diagram of an example system 100 of autonomous submersible structures that are configured to assemble to form a modular breakwater in a body of water. The system 100 includes structure 101 and structures 102a, 102b, and 102c ("structures 102") that are each configured to mechanically link to any of the other structures 101, 102 to form a breakwater.

In the example of FIG. 1, structures 102 are selected to assemble to form a breakwater 110 in a body of water near a shore 111. When the structures 102 assemble to form the breakwater 110, the breakwater 110 can protect the shore 111 from waves 112. The waves 112 can be caused by a weather event such as a hurricane 120. The autonomous submersible structures 101, 102 can autonomously assemble, disassemble, and reassemble as instructed by a control system.

The structures 101, 102 can have multiple configurations. In some examples, before receiving instructions to transit to the destination location, the structures may be in a floating configuration. Upon receiving instructions to transit to the destination location, the structures can change configuration from the floating configuration to a water transit configuration. Upon arriving at the destination location, the structures can change configuration from the water transit configuration to a breakwater configuration. The multiple configurations are described in greater detail with reference to FIGS. 3A to 3C.

Figure 2A:
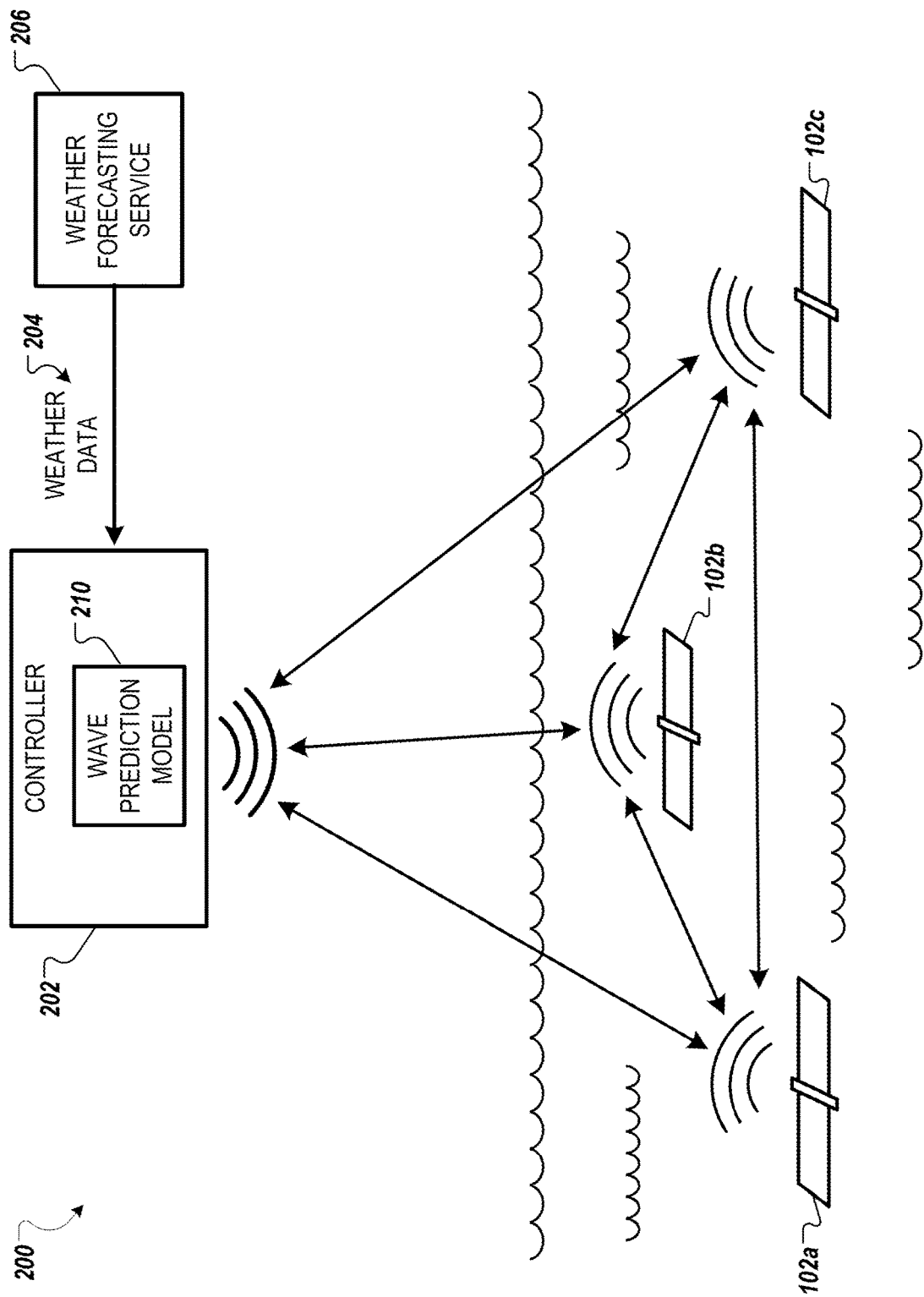
FIGS. 2A and 2B are diagrams of example communications and control systems of an autonomous modular breakwater system.

FIG. 2A is a diagram of example communications and control system 200 of an autonomous modular breakwater system. The system 200 includes a controller 202 and autonomous submersible structures 102. The structures 102 can be controlled by the controller 202.

In some examples, each autonomous submersible structure 102 includes a wireless communication module. Each wireless communication module can be configured to enable communication between the autonomous submersible structure and the controller 202, and to enable communication between the autonomous submersible structure and other autonomous submersible structures.

The system 200 includes a controller 202. The controller 202 can be a computing system that is capable of communicating wirelessly with the components of the autonomous modular breakwater system. In some examples, the controller 202 can be located remotely from the other components of the system 200. For example, the controller 202 may be located at a shipping port or other land location, such as on the shore 111. In some examples, the controller 202 can be cloud-based.

The controller 202 can perform functions such as tracking and directing movement of the components of the system 200. The controller 202 can also direct operations of the components of the system 200, e.g., operations for linking multiple structures 102 with each other by engaging and disengaging interlocking mechanisms of the structures.

In some examples, the controller 202 can determine a location for construction of a breakwater. The controller 202 can determine a location for construction of a breakwater based on predicted weather events, based on pre-programmed instructions, based on user input, etc.

In some examples, pre-programmed instructions can include a schedule for constructing the breakwater. For example, the schedule can include times of year that the breakwater 110 should be constructed near the shore 111. In some examples, the schedule can be based on meteorological or astronomical seasons. For example, the pre-programmed instructions can include instructions to construct the breakwater 110 at or near the beginning of a hurricane season, and to deconstruct the breakwater 110 at or near the end of the hurricane season.

In some examples, the breakwater can be constructed in response to user input. For example, a user may provide input to a controller 202 requesting that the breakwater 110 be constructed near the shore 111 at or around a particular time. The user may also provide input to a controller 202 requesting that the breakwater 110 be deconstructed at or around a particular time. As an example, a sailing or swimming event may be scheduled to take place near the shore 111 on a particular date. The controller 202 may receive user input requesting that the breakwater 110 be constructed prior to the event, and that the breakwater 110 be deconstructed after the event. In some examples, the user input can specify a size or position of the breakwater 110 to be constructed. For example, the user input can specify a length of the breakwater 110, a distance of the breakwater from the shore 111, etc.

In some examples, the controller 202 can receive data indicating a predicted weather event and determine the location for constructing the breakwater based on the predicted weather event. For example, the controller 202 can receive weather data 204 from a weather forecasting service 206. In some examples, the weather data 204 can include predicted wave activity in a particular geographic region or multiple geographic regions.

In some examples, the controller 202 can store a wave prediction model 210. The wave prediction model 210 can include wave data, e.g., predicted wave heights and speeds for various time frames and geographic regions. The controller 202 can update the wave prediction model 210 based on received weather data 204.

In an example, the controller 202 can receive weather data 204 from the weather forecasting server 206 that indicates a predicted hurricane 120. The weather data 204 can include a predicted path of the hurricane 120, predicted closest point of approach between the hurricane 120 and the shore 111, predicted time of arrival at the closest point of approach, strength of the hurricane 120, size of the hurricane 120, etc. Based on the weather data 204, the controller 202 can update the wave prediction model 210. Based on the updated wave prediction model 210, the controller 202 can predict wave conditions at the shore 111 over time.

The controller 202 can determine, based on the weather prediction model 210, to construct a breakwater at a geographic location near the shore 111. The controller 202 can also determine a time that the breakwater is to be constructed, a size of the breakwater, and an orientation of the breakwater. The controller 202 can determine the time, e.g., based on the predicted time of arrival of the hurricane 120. The controller 202 can determine the size, e.g., based on the size of the hurricane 120, the size of the predicted waves, etc. The controller 202 can determine the orientation, e.g., based on a predicted path of the hurricane 120.

In some examples, the controller 202 can select a subset of the autonomous submersible structures to form the breakwater. For example, the controller 202 can determine to construct the breakwater 110 near the shore 111 and can select a subset of structures for constructing the breakwater 110. For example, the system 100 includes structure 101 and structures 102. The controller 202 selects the structures 102 for constructing the breakwater 110, but does not select the structure 101. The controller 202 can transmit instructions to each of the selected structures 102 that cause the structures 102 to transit to the geographic destination of the breakwater to be constructed. The instructions can cause the structures 102 to assemble to form the breakwater 110, e.g., in advance of the arrival of the hurricane 120.

In some examples, some of the structures can be self-propelled, while other structures might not include a propulsion system. A self-propelled structure can be configured to tow one or more non-propelled structures to the geographic destination. For example, the controller 202 can select a subset of structures that includes at least one self-propelled structure and at least one non-propelled structure. The controller 202 can transmit instructions that cause the self-propelled structure to mechanically link to the non-propelled structure and to tow the non-propelled structure to the geographic destination of the breakwater.

In some examples, the controller 202 can determine a size of the breakwater, and select a subset of the autonomous submersible structures based at least in part on the size of the breakwater. The controller 202 can determine a size of the breakwater, e.g., based on the wave prediction model 210. When the wave prediction model 210 predicts larger or faster waves, the controller 202 may determine a larger breakwater size compared to when the wave prediction model 210 predicts smaller or slower waves. In some examples, the controller 202 may determine to construct more than one breakwater. For example, when the weather data 204 includes a large predicted storm, the controller 202 may determine to construct two or more breakwaters near the shore 111. The two or more breakwaters can be constructed such that multiple layers of breakwaters are positioned between the waves 112 and the shore 111.

In some examples, the controller 202 can determine a number of structures that are needed to form the breakwater of the determined size. For example, the controller 202 may determine to construct a breakwater having a size of two hundred meters long. Each structure 102 may have a length of twenty meters long. Thus, the controller 202 can select a subset of ten structures to form the breakwater with a length of two hundred meters. A length of each structure can be measured along a direction that is parallel with the water surface when the structure is in a breakwater configuration. In some examples, a structure can have a variable size. For example, each structure 101, 102 may have a minimum length and a maximum length. The structures 101, 102 may be able to expand and contract in size between the minimum length and the maximum length.

In some examples, different structures may be of different sizes. For example, the structure 102a may be twenty meters long, the structure 102b may be fifteen meters long, and the structure 102c may be twenty-five meters long. In some examples, the controller 202 can store, e.g., in a database, data indicating a size of each of the structures. In some examples, the controller 202 can receive, from each structure, data indicating a size of the structure.

In some examples, the controller 202 can determine an initial location of each of the autonomous submersible structures, e.g., a location of the structure prior to receiving instructions to form the breakwater. Each of the autonomous submersible structures 101, 102 can include a wireless communication module for communicating with the controller 202 and with other structures. The controller 202 can receive, from each of the wireless communication modules, data indicating a location of the respective autonomous submersible structure.

For example, the controller 202 can receive, from the wireless communication modules of each of the structures 101, 102, data indicating the geographic coordinate location of the structure. In some examples, the controller 202 can receive data indicating the location of the structure occasionally or at time intervals, e.g., once per minute, once per ten minutes, once per hour, etc. In some examples, the controller 202 can receive data indicating the location of the structure in response to sending a request to the structure. For example, upon determining to construct the breakwater, the controller can perform a polling operation to poll each of the structures 101, 102 in order to obtain its current location.

The controller 202 can select the subset of the plurality of autonomous submersible structures based at least in part on the initial location of each of the plurality of autonomous submersible structures. For example, the controller 202 may determine to construct the breakwater 110 from three structures, and may receive data indicating the initial location of four structures 102a, 102b, 102c, and 101. The controller 202 can therefore select three out of the four structures for constructing the breakwater. In some examples, the controller 202 can select the structures by selecting the three structures for which the initial location is nearest to the location for constructing the breakwater. In some examples, the controller 202 can select the structures by selecting the three structures that are in a favorable position with respect to the location for constructing the breakwater, e.g., three structures that are upstream of a current compared to the location of constructing the breakwater.

The controller 202 can track and control movements of the structures in the body of water. For example, the controller 202 can transmit, to each of the structures 102, instructions to transit from the respective initial location to a destination location for construction of the breakwater. In response to receiving the instructions, the structures 102 travel to the destination location and link with other structures to form the breakwater. The controller 202 can send instructions to recall or move the structures, for example, due to changes in seasons or weather.

In some examples, the controller 202 can transmit, to each of the structures 102, navigation instructions. The navigation instructions can include navigation waypoints, a geographic destination, a travel route, a target time of arrival, a travel speed, or any combination of these. Upon receiving the navigation instructions, the structures 102 can autonomously transit through the body of water in accordance with the instructions.

In the example of FIG. 1, in response to receiving navigation instructions from the controller 202, structure 102a transits along path 103, structure 102b transits along path 105, and structure 102c transits along path 107 to arrive at the location for constructing the breakwater 110. In some examples, the structures 102 can be controlled to arrive at the destination location based on a schedule. The controller 202 can control the structures 102 to arrive at the destination at approximately the same time, e.g., within ten minutes of one another, within one hour of one another, or within the same day as one another.

In some examples, the location for constructing the breakwater can include a cardinal angle of the breakwater. For example, the controller 202 can determine to construct the breakwater 110 so that a length of the breakwater extends in a direction at a cardinal angle of forty-five degrees with respect to north.

In some examples, the location for constructing the breakwater can include a distance of the breakwater from a shoreline. For example, the controller 202 can determine to construct the breakwater 110 at a distance of one hundred meters from the shore 111. The distance from the shoreline can be, e.g., an average distance from the shoreline, a minimum distance from the shoreline, a maximum distance of the shoreline, etc.

In some examples, the location for constructing the breakwater can include a geographic location of an endpoint of the breakwater. For example, the controller 202 can determine that the breakwater 110 be constructed with a southern-most endpoint 114 being positioned at a particular latitudinal and longitudinal coordinate location, with a northernmost endpoint 116 being positioned at a particular latitudinal and longitudinal coordinate location, or both. In some examples, the location for constructing the breakwater can include a geographic location of a center point of the breakwater. For example, the controller 202 can determine that the breakwater 110 be constructed with a center point 118 of the breakwater 110 being positioned at a particular latitudinal and longitudinal coordinate location.

In some examples, the controller 202 can control the structures 102 such that a first structure arrives at the location, and other structures assemble based on the position of the first structure. For example, the controller 202 can control the structures 102 such that the structure 102a arrives at the location first, and positions itself at an assigned orientation with endpoint 114 at an assigned geographic coordinate. The controller 202 can control the structures 102 such that the structure 102b arrives at the location after the structure 102a, and links to the structure 102a that is already in place.

In some examples, the controller 202 can transmit instructions to each structure 102 that cause the structure to mechanically couple to at least one other structure 102 to form the breakwater. For example, the controller 202 can send instructions that cause a particular structure to mechanically couple to any other structure. For example, the structures 102a and 102b may arrive at the location before the structure 102c. The structure 102a can mechanically couple with the structure 102b, e.g., based on the structure 102b approaching within a threshold proximity to the structure 102a. The structure 102c can then mechanically couple to the structure 102b or to the structure 102a upon arrival at the location.

In some examples, the controller 202 can transmit instructions to each structure 102 that cause the structure to mechanically couple to a particular other structure. For example, the structure 102a can receive instructions from the controller 202 to mechanically couple to the structure 102b. Therefore, the instructions will cause the structure 102a to couple to the structure 102b, even if the structure 102c approaches within a threshold proximity to the structure 102a before the structure 102b approaches within the threshold proximity to the structure 102a.

In some examples, the controller 202 can determine to deconstruct the breakwater. For example, after the hurricane 120 passes the shore 111, the controller 202 can determine that based on the wave prediction model 210, the breakwater 110 is no longer needed. The controller 202 can transmit, to each of the structures 102, instructions to mechanically decouple from each other.

In some examples, after deconstructing the breakwater 110, the controller 202 can determine to construct a new breakwater at another location. The controller 202 can select another subset of structures and transmit instructions to each selected structure that cause the structure to transit to the location for constructing the new breakwater.

In some examples, after deconstructing the breakwater 110 the controller 202 can transmit an instruction to each structure 102 that releases the structure 102 from control by the controller 202. In some examples, upon release, the structure 102 can change configuration from a breakwater configuration to a water transit configuration and can return to its initial location. In some examples, upon release, the structure 102 can change configuration to the water transit configuration and proceed to a previously assigned location or to a newly assigned location according to navigation instructions.

In some examples, the breakwater includes the selected structure 102s linked in an approximately linear configuration from an overhead perspective. For example, the structures 102 link to form the breakwater 110 which forms a linear configuration from an overhead perspective, as shown in FIG. 1. The linear breakwater 110 extends from the endpoint 114 to the endpoint 116.

Figure 2B:
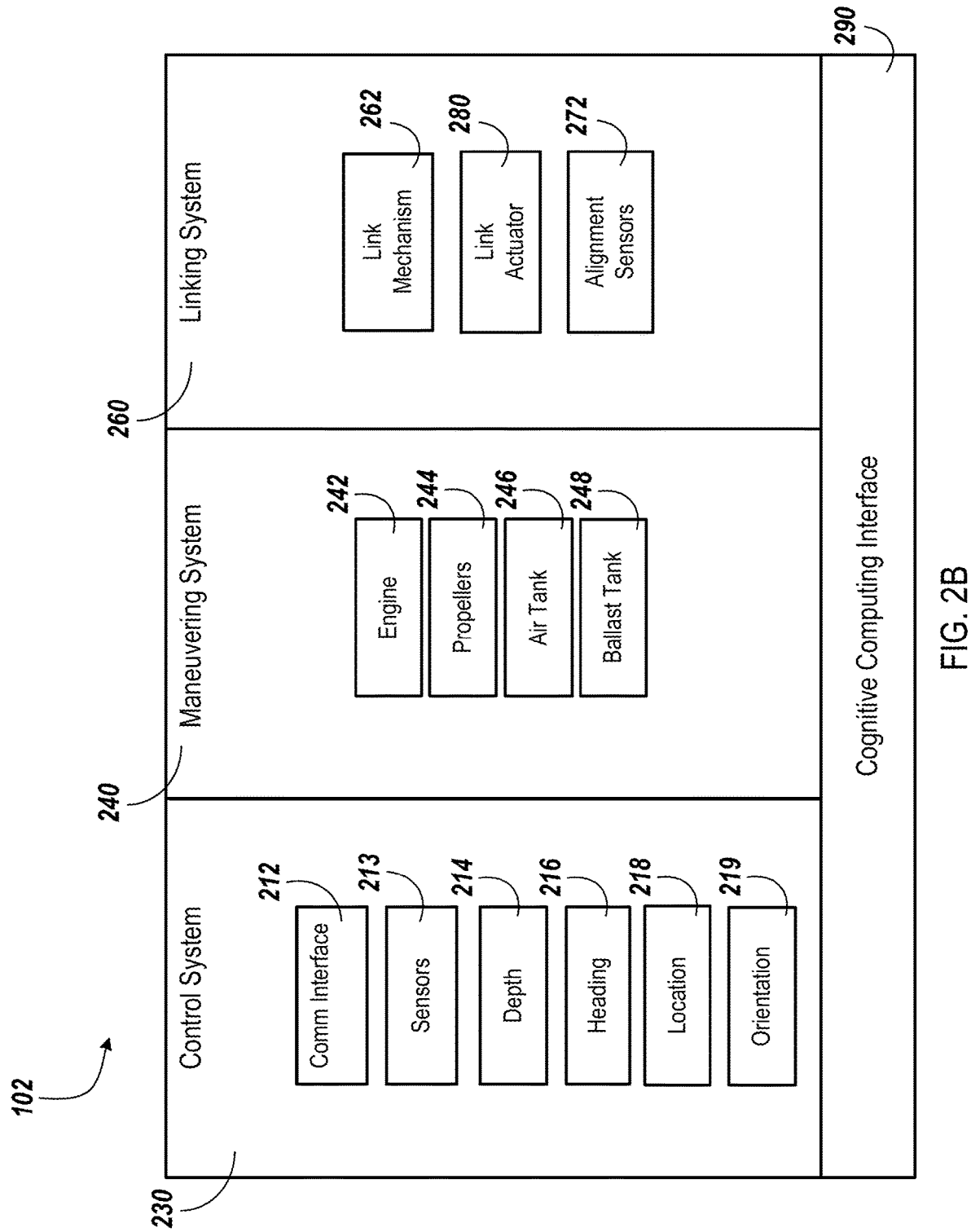

FIG. 2B is a block diagram of an example autonomous submersible structure 102. The structure 102 includes a control system 230, a maneuvering system 240, and a linking system 260. The control system 230, the maneuvering system 240, and the linking system 260 are each communicably connected to a cognitive computing interface 290. The interface 290 is configured to transmit data to and receive data from each of the control system 230, the maneuvering system 240, and the linking system 260. The interface 290 facilitates communication between each of the control system 230, the maneuvering system 240, and the linking system 260.

As the structures 102 transit through water, a control system 230 of each structure 102 can control a maneuvering system 240 of the structure 102. The maneuvering system 240 of the structure 102 can include engines 242, propellers 244, air tanks 246, ballast systems 248, etc. The maneuvering system of the structure 102 can control the direction of travel of the structure 102, the depth of the structure 102, etc. For example, the maneuvering system can be controlled to navigate the structure 102 around obstacles, to submerge and surface the structure 102, to change physical configurations of the structure 102, etc.

The control system 230 can receive data readings from sensors 213 associated with the structure 102. In some examples, these data readings are received in real-time. The data can include readings of environmental parameters, such as the location of the structure 102, the water temperature, water salinity, water pH, water pressure, etc. surrounding the structure 102. In some examples, the sensors 213 are coupled to the structure 102. For example, the sensors 213 can be coupled to the outside of the structure 102 and can travel with the structure 102. In some examples, the sensors 213 are located proximate to the structure 102. For example, the sensors can be placed along an expected path of the structure 102.

In some implementations, the control system 230 can control the maneuvering system 240 of the structure 102 to navigate in an orientation that reduces drag or resistance through the water. For example, the control system 230 can control the maneuvering system 240 of the structure 102 to change the physical configuration to a water transit configuration that is streamlined in the water.

In some examples, the control system 230 can receive navigation instructions from the controller 202. In some examples, the control system 230 can generate navigation instructions based on input from the controller 202. For example, the controller 202 can transmit a destination location to the control system 230. The control system 230 can then generate navigation instructions that cause the structure 102 to transit from a current location to the destination location.

Based on the navigation instructions, the control system 230 can control the maneuvering system 240 of the structure 102 to navigate the structure 102 according to the navigation instructions. For example, the control system 230 can control the maneuvering system 240 to navigate the structure 102 to the location for constructing the breakwater, and can control the structure 102 to remain in the location for a period of time.

The control system 230 can control the structure 102 according to navigation instructions. The navigation instructions can include depths 214, headings 216, locations 218, orientations 219, etc. For example, the navigation instructions can include a new depth for the structure 102. The control system 230 can control the maneuvering system 240 based on the new depth to raise or lower the structure 102 within a water column. The navigation instructions can include a new orientation 219 for the structure. The control system 230 can control the maneuvering system 240 based on the new orientation 219 to rotate the structure 102, e.g., by submerging part of the structure 102.

In some examples, the control system 230 can receive data readings from sensors 213 in real-time and determine navigation instructions in real-time. For example, the control system 230 may receive a data reading indicating weather conditions such as lightning, hurricanes, tropical storms, tornados, tsunamis, etc. Based on the data indicating the weather conditions, the control system 230 can determine new navigation instructions to steer the structure 102 away from the hurricane or dive to a depth that reduces an impact to the structure 102 from a storm.

In some examples, readings from the sensors 213 can indicate obstacles, such as ships, wreckage, reefs, shorelines, farms, etc. For example, the control system 230 can receive data readings from sensors 213 indicating that the structure 102 will be navigating into a reef and determine new navigation instructions to steer the structure 102 away from the reef.

The depth 214 indicates a depth in water of the structure 102. The depth 214 can be measured as a depth from the water surface, from the bottom of the ocean, etc. The depth 214 is determined by the control system 230, and is used to control the maneuvering system 240 to navigate the structure 102 in the water. In some examples, the depth 214 is determined by the control system 230 using the sensors 213. For example, the control system 230 can determine the boundaries of a strong current in a direction opposite to the current heading of the autonomous submersible vehicle, and determine that if the structure 102 sank in depth by five feet, the structure would be able to steer out of the strong current.

In some examples, certain portions of the structure 102 cannot be above water. For example, the propellers 244 of the structure 102 might not be permitted to be above water. In some examples, the control system 230 can use input from the sensors 213 to determine how much of the structure 102 is below water. For example, the control system 230 can determine that the structure 102 is partially submerged, and that the propellers 244 are still submerged. If the control system 230 determines a depth 214 that will cause the propellers 244 to breach the water surface, the control system 230, the cognitive computing interface 290, or a remote server to which the control system 230 is communicatively coupled, can determine that the control system 230 must determine new navigation instructions. The new navigation instruction can be determined based on the minimum depth that the structure 102 can achieve without exposing the propellers to the surface.

The control system 230 can use machine learning models. These models may be models which accept sensor data collected by cameras and/or other sensors as inputs. The machine learning models may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning models may use supervised learning. In some examples, the machine learning models use unsupervised learning.

The communications systems include networks over which data regarding weather conditions, water quality, etc. The communications system can be a wired connection or a wireless connection. For example, the communications system can be implemented over a wireless network such as a cellular or satellite network to share water quality data with other structures. The communications system allows the structure 102 to communicate with systems such as central control centers that monitor and forecast weather and conditions.

The heading 216 indicates a direction of motion of the structure 102. The heading 216 can be determined by the control system 230, and can be used to control the maneuvering system 240 to navigate the structure 102 through the water. In some examples, the heading 216 is set by the control system 230 based on data from the sensors 213. For example, the control system 230 can determine the location of a hurricane along the course of travel of the structure 102, and determine that if the structure 102 changed heading by three degrees toward North, the structure would be able to steer around the hurricane.

The location 218 can include a current location, a destination location, or both, of the structure 102. The location 218 can include global coordinates, an address, etc. The location 218 is determined by the control system 230, and can be used to control the maneuvering system 240 to navigate the structure 102 through the water. In some examples, the location 218 is determined by the control system 230 using data from the sensors 213.

The interface 290 is configured to transmit data to and receive data from the control system 230 and the maneuvering system 240 such that the navigation instructions determined by the control system 230 are used to control the maneuvering system 240.

The control system 230 can direct the vertical motion and positioning of the structure 102. The control system 230 can control the depth of the structure 102 within a water column, the speed of the structure 102 within a body of water, and the ascent and/or descent of the structure 102 within a body of water, among other movements of the structure 102. The control system 230 can control the motion and positioning of the structure 102 by generating control signals for the maneuvering system 240.

The control system 230 controls the maneuvering system 240 to steer the structure 102. The control system 230 is communicatively coupled to the maneuvering system 240. In some implementations, the control system 230 is coupled to the maneuvering system 240 through communication buses within environmentally sealed conduits. In some implementations, the control system 230 transmits control signals to the maneuvering system 240 wirelessly through various wireless communications methods, such as RF, sonic transmission, electromagnetic induction, etc.

The control system 230 can determine a path through the water and corresponding control signals for the maneuvering system 240 locally. In some implementations, the control system 230 is communicatively coupled to sensors and a communications interface 212, and uses data collected by the sensors and communications interface 212 to navigate. In some implementations, the control system 230 is coupled to the sensors and communications interface 212 through communication buses within environmentally sealed conduits. In some implementations, the control system 230 receives sensor data from the sensors and communications interface 212 wirelessly through various wireless communications methods, such as RF, sonic transmission, electromagnetic induction, etc.

In some implementations, the control system 230 communicates with a remote server, e.g., controller 202 through the sensors and communications interface 212 to receive new headings. For example, the sensors and communications interface 212 can transmit position data of the structure 102 to a remote server, which processes the data and transmits a new heading to the control system 230. The control system 230 can receive the new heading, process the data, and generate updated control signals for the maneuvering system 240. In some implementations, the control system 230 communicates with a remote server through the sensors and communications interface 212 to receive new control signals for the maneuvering system 240.

In some implementations, the control system 230 can generate updated control signals for the maneuvering system 240 locally, without communicating with a remote server. For example, the control system 230 can receive data from the sensors and communications interface 212, process the data to determine a new heading, and generate updated control signals for the maneuvering system 240. In some implementations, the control system 230 can provide navigation signals to the structure 102 without the use of GPS. For example, the control system 230 can navigate the structure 102 using positioning data collected by the sensors and communications interface 212.

The control system 230 can control the maneuvering system 240 to keep the structure 102 geostationary. For example, when in the breakwater configuration and linked to other structures, the control system 230 can receive feedback from the maneuvering system 240 and the sensors and communications interface 212 to maintain a position in which the structure is to remain.

The maneuvering system 240 receives input from multiple sources, including the control system 230. For example, the maneuvering system 240 can receive a control signal from the control system 230. In some examples, the maneuvering system 240 can receive the one or more navigation instructions determined by the control system 230 and determine a control signal that controls the components of the maneuvering system 240. In some examples, the cognitive computing interface 290 receives the one or more navigation instructions determined by the control system 230 and determines a control signal for the maneuvering system 240.

In some examples, the maneuvering system 240 includes a controller that controls all components of the maneuvering system 240. For example, the maneuvering system 240 can include a central controller that transmits control signals to each of the engine 242, the propellers 244, the air tank 246, and the ballast tanks 248. In some examples, the maneuvering system 240 includes a controller for each component of the maneuvering system 240. For example, the maneuvering system 240 can include a separate controller that transmits control signals to each of the engine 242, the propellers 244, the air tank 246, and the ballast tanks 248.

A power generation system can provide power for each of the control system 230, the maneuvering system 240, and the linking system 260. The power generation system can include generators, batteries, or any combination of these. In some implementations, the power generation system can use a heat sink engine, using cold water driven to deeper depths for driving its heat exchange. In some implementations, the power generation system can use ocean thermal energy conversion (OTEC) to generate electric power for the various systems of the structure 102. In some implementations, the power generation system can use a solar power system, such as solar panels, to generate electric power for the various systems of the structure 102. In some implementations, the power generation system uses other renewable energy systems, such as wind, harvesting energy from the waves and currents, etc. In some implementations, the power generation system can use generators powered by resources such as natural gas. In some implementations, the power generation system can be recharged when the structure 102 is serviced, or when maintenance is performed on the structure 102.

The power generation system can utilize direct wind power through a system of sails and keels. The power generation system can utilize one or more wind turbines alone, or in combination with power storage systems such as batteries. The power generation system can utilize a sea anchor that is raised or lowered with a winch to capture currents at different depths that may flow in directions different than at the surface. The power generation system can utilize wave energy through direct electricity generation. For example, the power generation system can be integrated with the maneuvering system 240 and directly power propellers through wave energy electricity generation. The power generation system can utilize wave energy through subsurface gliders.

In some implementations, the maneuvering system 240 includes a set of propellers 244. In some implementations, the propellers are two offset propellers 244 which allow the structure 102 to be steered, as well as change depth. In some implementations, the propellers 244 each have a large diameter relative to the size of the structure 102.

The propellers 244 can be positioned on the exterior of the structure 102 that are controlled to propel the structure 102 through the water. In some examples, the propellers can be independently controlled. In some examples, the propellers are controlled by the maneuvering system 240 to steer the structure 102. The propellers can be controlled to change the direction, speed, etc. of the structure 102. In some examples, the maneuvering system can include one or more rudders for controlling the direction of travel of the structure 102.

The propellers 244 can be controlled by the maneuvering system 240 based on the one or more navigation instructions determined by the control system 230. For example, the cognitive computing interface 290 can receive the one or more navigation instructions determined by the control system 230 and generate a control signal for the propellers 244. In some examples, the maneuvering system 240 can receive the one or more navigation instructions and generate a control signal for the propellers 244.

The air tank 246 can be a tank filled with air that is used to blow water out of the structure 102. In some examples, the air tank 246 contains compressed air that forces water out of the ballast tanks 248. The air tank 246 can push water through valves of the structure 102 to increase the buoyancy of the structure 102. In some examples, the air tank 246 can be controlled by the maneuvering system 240 based on the one or more navigation instructions determined by the control system 230. For example, the air tank 246 can be controlled to force water out of the ballast tanks 248 based on a change in depth that decreases the depth of the structure 102.

The ballast tanks 248 can include one or more compartments within the structure 102 that holds water to provide stability for the submersible structure. In some examples, the ballast tanks 248 can be controlled by the maneuvering system 240 based on the one or more navigation instructions determined by the control system 230. For example, the ballast tanks 248 can be pumped with water to decrease buoyancy of the structure 102 if the depth 214 determined by the control system 230 requires an increase in depth of the structure 102. In some examples, a ballast located at one part of the structure can be filled with water in order to increase the depth of that part of the structure, while other parts of the structure might not change depth. In this way, the ballast tanks 248 can be used to tilt or rotate the structure 102.

The linking system 260 includes link mechanisms 262, link actuators 280, and alignment sensors 272. The linking system 260 can be used to mechanically couple the structure 102 with another structure or with multiple other structures. The link mechanisms 262 can include, for example, any combination of pins, slots, fasteners, latches, bolts, clamps, hooks, etc. The link mechanisms 262 can be operated by the link actuators 280. For example, a link actuator 280 can include a motor that causes the link mechanism 262 to attach to a link mechanism of another structure.

The alignment sensors 272 can be used to align the structure 102 with another structure. For example, the alignment sensors can include one or more cameras or sonar sensors that can detect the presence of another structure and determine a relative position and proximity of the other structure. In some examples, the control system 230 can control the maneuvering system 240 based on sensor data from the alignment sensors 272. For example, the control system 230 can receive sensor data from the alignment sensors 272 indicating that an adjacent structure is positioned at a proximity from the structure 102 that is greater than a threshold proximity for linking. The control system 230 can control the maneuvering system 240 to cause the structure 102 to move closer to the adjacent structure to align the link mechanism 262 with a corresponding link mechanism of the adjacent structure. When the data from the alignment sensors 272 indicate that the adjacent structure is positioned within the threshold proximity, and that the link mechanisms are aligned, the control system can control the link actuator 280 to cause the link mechanism 262 to link to a link mechanism of the adjacent structure.

In some examples, the control system 230 can communicate with other structures using the communications interface 212. For example, when the structure 102 approaches another structure, the control systems of the two structures can communicate with one another in order to align their respective link mechanisms. In some examples, the control system 230 can communicate with an adjacent structure through the communications interface 212 in order to assign one structure as a "guide" structure and another structure as a "follower" structure. For example, the control system 230 can communicate with an adjacent structure to assign the adjacent structure as a "guide" structure, causing the adjacent structure to cease movement and remain in place. The structure 102 can therefore act as a "follower" structure, and align the structure 102 with the guide structure based on data from the alignment sensors 272.

FIGS. 3A-3C are diagrams showing configurations of structures of an autonomous modular breakwater system. Each structure can include a maneuvering system that is configured to propel the structure through water. The maneuvering system can also configure the structure in at least two different configurations. The configurations can include at least a water transit configuration and a breakwater configuration.

FIG. 3A shows the structures 102 in example water transit configurations. In a water transit configuration, the structures 102 are configured to be propelled through the water by a propulsion system. In some examples, the water transit configuration can include a floating, or unsubmerged position. In some examples, the water transit configuration can include a partially submerged or fully submerged position.

The structures 102 each include a base portion positioned at or near a midpoint of the structure 102a. In each of the example structures 102, the base portion is in the form of a column 310. The column 310 can include a housing for components of the structure.

The structures 102 each include a first portion 322 and a second portion 324 that are each mechanically coupled to the column 310. The first portion 322, the second portion 324, or both, can be maneuverable about the column 310. For example, the maneuvering system 240 can include one or more mechanisms for pivoting or rotating the first portion 322 and the second portion 324 about the column. In some examples, the first portion 322a and the second portion 324a can each have an approximately planar shape.

As shown in FIG. 3A, structure 102a is in an example floating position. In the example floating position, the column 310a has a length that extends in a direction approximately parallel to the water surface. Planar surfaces of the first portion 322a and the second portion 324a each extend in a plane that is approximately parallel to the water surface.

As shown in FIG. 3A, structure 102b is in an example partially submerged position. In the example partially submerged position, the column 310b has a length that extends in a direction approximately parallel to the water surface. The column 310b may be positioned at a depth that is at or below the water surface. Planar surfaces of the first portion 322b and the second portion 324b each extend in a plane that is approximately orthogonal to the water surface. Portion 322b is extending vertically upward, e.g., such that some or all of the portion 322b may be above the water surface. Portion 324b is extending vertically downward, e.g., such that the portion 324b is below the water surface.

As shown in FIG. 3A, structure 102c is in a submerged, or at least partially submerged, position. In the example submerged position, the column 310c has a length that extends in a direction approximately parallel to the water surface. The column 310c may be positioned at a depth that is at or below the water surface. Planar surfaces of the first portion 322c and the second portion 324c each extend in a plane that forms a non-zero angle with respect to the water surface. Portions 322c and 324c form an approximate "V" shape, with the column 310c at the apex of the "V." The portions 322c and 324c are below the water surface.

In some examples, an example structure 102 can maneuver from a floating position, e.g., the floating position of structure 102a, to a submerged or partially submerged position, e.g., the partially submerged positions of structure 102b or 102c, by rotating portions of the structure about the column 310. For example, the control system 230 can control the maneuvering system 240 to change the position or orientation of the first portion 322, the second portion 324, or both, with respect to the position of the column 310.

Upon arriving at the location, the structures 102 can change from the water transit configuration to the breakwater configuration. In some examples, a control system of a structure 102 can determine that the structure has arrived at the location, and in response, cause the maneuvering system to configure the structure 102 in the breakwater configuration. In some examples, the controller 202 can determine that the structure 102 has arrived at the location, and in response, transmit an instruction that causes the structure 102 to change configurations.

FIG. 3B shows the structures in example breakwater configurations. Changing the structure 102 from the water transit configuration to the breakwater configuration can include, for example, orienting attenuating surfaces of the structure towards incident waves. For example, attenuating surfaces can include the planar surfaces of the portions 322 and 324. The control system 230 can control the maneuvering system 240 to maneuver the structure 102 such that the planar surfaces of the portions 322, 324 are approximately orthogonal to the wave direction. In FIG. 3B, the wave direction is represented by arrow 316.

In some examples, changing from the water transit configuration to the breakwater configuration can include rotating the base portion, e.g., the column 310, from an orientation in which the length of the column 310 extends in a direction approximately parallel to the water surface to an orientation in which the length of the column 310 extends in a direction approximately orthogonal to the water surface. For example, the control system 230 of the structure 102 can control the maneuvering system 240 to operate ballast tanks 248, air tanks 246, propellers 244, etc., to change the orientation of the column 310.

Changing the structure 102 from the water transit configuration to the breakwater configuration can include increasing, e.g., maximizing, a surface area of the structure that is facing incident waves. Increasing the surface area can include, for example, extending the first portion 322 and the second portion 324 such that planar surfaces of the first portion 322 and the second portion 322 are parallel to each other, are aligned with each other, or both. The structure 102 can orient to a position facing the incident waves, e.g., based on instructions received from the controller 202.

In the breakwater configuration, the structures 102 are configured to attenuate energy of incident waves. In some examples, the breakwater configuration can include a ballasted, or at least partially submerged position. In some examples, the breakwater configuration can include a position in which the length of each column 310 extends in a direction that forms at a non-zero angle with respect to the water surface. In some examples, the breakwater configuration can include a position in which surfaces of the portions 322 and 324 form a revetment slope for attenuating incident waves. In the example partially submerged position shown in FIG. 3B, the length of each column 310 extends in a direction that is approximately orthogonal to the water surface and orthogonal to incident waves.

In some examples, when the structures 102 are in the breakwater configuration, the structures 102 can autonomously maintain position relative to each other. Each structure 102 can maintain a position such that a distance between the structure and an adjacent structure remains approximately constant over time. As an example, the structure 102*a* can maintain itself at a position that is aligned with the structure 102*b* and is at a distance from the structure 102*b* of between five feet and ten feet.

In some examples, when the structures 102 are in the breakwater configuration, the structures 102 can each autonomously maneuver to link to another structure 102. Each structure 102 can include a linking system, e.g., linking system 260, that is configured to couple the structure to at least one other structure. For example, the structure 102*b* can include a linking system that is configured to mechanically couple the structure 102*b* to a structure, e.g., structure 102*a*, at a first side 306 of the structure 102*b*, and to another structure, e.g., structure 102*c*, at a second side 308 of the first structure 102*b*. The linking systems of the structures 102 can include interlocking mechanisms, e.g., the link mechanisms 262 as described with respect to FIG. 2B.

In some examples, the controller 202 or the control system 230 of each structure 102 can control the respective maneuvering systems 240 in order to align the interlocking mechanisms of the structures. For example, the controller or the control system 230 can determine to align the structures 102 with each other in accordance with alignment criteria.

Alignment criteria can include, for example, a maximum threshold proximity between structures, a maximum speed through the water of the structures, a maximum offset angle between the structures, etc. For example, the structures 102*a* and 102*b* may satisfy alignment criteria by the structure 102*a* being within a maximum threshold proximity to structure 102*b*, by the structures 102*a* and 102*b* both traveling at a speed that is below the maximum threshold speed through the water, by an offset angle between the structures 102*a* and 102*b* being less than a maximum offset angle, etc.

When the structures 102 satisfy the alignment criteria, the control systems of the structures can control the respective linking system, causing the interlocking mechanisms of the structures to link to each other. In the example of FIG. 3B, the linking of structure 102*a* to 102*b*, and of structure 102*b* to 102*c*, is represented by arrows 314. FIG. 3C shows the structures 102 having formed the breakwater 110 after mechanically coupling to each other.

In some examples, one or more structures 102 can include an anchoring device 302. The anchoring device 302 can hold the structures 102 in a steady position in the water. The anchoring device can include, for example, a sea anchor such as a parachute anchor, a conical sea anchor, or a cylindrical sea anchor. In some examples, the anchoring device can include a seabed anchor.

In some examples, changing a configuration between the water transit configuration and the breakwater configuration includes deploying the anchoring device 302. In some examples, each structure 102 that is used to construct the breakwater includes an anchoring device. In some examples, each structure 102 deploys an anchoring device when in the breakwater configuration. In some examples, not all structures of the breakwater include an anchoring device. In some examples, not all structures that include an anchoring device will deploy the anchoring device when in the breakwater configuration.

In an example, the controller 202 can determine that not all structures of the breakwater 110 should deploy an anchoring device. The controller 202 can therefore transmit an instruction to the structure 102*b* that causes the structure 102*b* to deploy the anchoring device 302 when in the breakwater configuration or when linked to the structures 102*a* and 102*c*. The controller 202 can transmit an instruction to the structures 102*a* and 102*c* that cause the structures 102*a* and 102*c* not to deploy any anchoring devices.

In some examples, the controller 202 can determine to deploy anchoring devices or not to deploy anchoring devices based on the wave prediction model 210. For example, the controller 202 can determine to deploy more anchoring devices when larger waves are predicted by the wave prediction model 210, and to deploy fewer anchoring devices when smaller waves are predicted by the wave prediction model 210. In some examples, the control system 230 of each structure 102 can determine to deploy or not to deploy an anchoring device of the respective structure 102.

Figure 4:
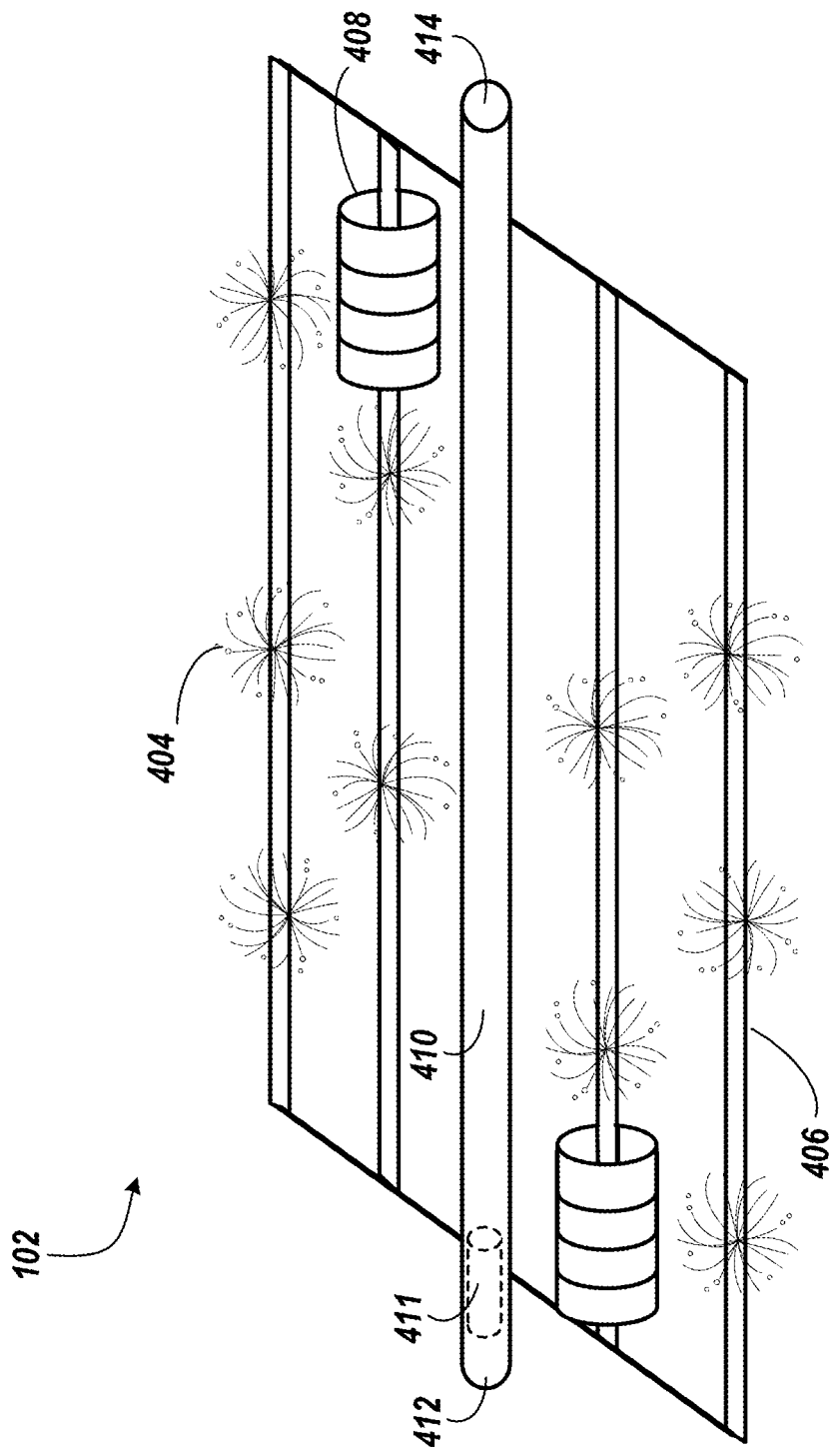
FIG. 4 is a diagram of an example configuration of an autonomous submersible structure for use in forming a modular breakwater system and supporting marine life.

FIG. 4 is a diagram of an example configuration of an autonomous submersible structure for use in forming a modular breakwater system and supporting marine life. The structure 102 can include a floating configuration for growing marine life.

In this example, the structure 102 is a platform that supports live marine life 404 by providing optimal growth conditions and physical support. The structure 102 is configured to navigate, untethered, in a body of water and to maintain predetermined conditions for the marine line contained on or within the structure 102 itself. In this particular example, when not in use as a component of a breakwater, the structure 102 is configured to navigate the open ocean and to maintain optimal conditions for the live marine life by raising and lowering itself within the ocean. The structure 102 supports marine life cultivation of various species, where marine life is attached to the structure 102 in various forms.

The structure 102 is a free-floating structure and is configured to autonomously navigate and control its depth to optimize growth conditions for the marine life 404. The structure 102 is configured to autonomously navigate currents to certain locations. In some implementations, the structure 102 can be tethered or moored to a stationary structure, such as a dock, a buoy, or the ocean floor, among other structures.

The marine life 404 can be algae or other aquatic lifeforms. In this particular example, the marine life 404 is macroalgae, or seaweed, and can be red, brown, or green seaweed. In some implementations, the marine life 404 is in the spore stage of growth, and the length of time the structure 102 autonomously navigates is the length of time required for the marine life 404 to be ready for harvesting.

The structure 102 can include support structures 406 on which the marine life 404 grows. The structure 102 can be tailored to the type of the marine life 404 that it supports. For example, the structure 102 can include the support structures 406 tailored to the species of marine life that are growing on the structure 102. The support structure 406 can be made of poles embedded in sediment, floating buoys, cables, ropes, nets, inflatable structures, and rigid frames, among other types of materials. For example, the support structures 406 can be made of material that is seeded with nutrients selected for a particular species of the marine life 404 or a desired resulting composition of the marine life 404.

In some implementations, the support structures 406 span the structure 102. In some implementations, the support structure 406 hangs from the structure 102 or other support structures 406. In this particular example, the support structures 406 span the structure 102 and hang from the structure 102. Structures 102 can have a mixture of multiple configurations of the support structures 406.

In some implementations, the structure 102 and the support structures 406 can collapse into more hydrodynamic configurations. For example, the control system 230 can detect an area of increased resistance and control the structure 102 and the support structures 406 to collapse into a structure with lower drag. In some implementations, the support structures 406 are foldable or rotatable around a center column 310.

In some implementations, the structure 102 includes protective devices for protecting the marine life 404. For example, the protective devices can include a protective casing 408. The protective casing 408 can be moveable, e.g., the protective casing can be expandable and/or retractable. The control system of the structure 102 can deploy the protective casing in order to protect the marine life 404. In some examples, the protective devices can be environmentally sealed to protect the marine life 404 from water.

In some examples, changing the configuration from the water transit configuration to the breakwater configuration includes deploying one or more protective devices to protect the marine life 404. In some examples, changing the configuration from the breakwater configuration includes retracting the protective devices.

In some examples, changing the configuration from the water transit configuration to the breakwater configuration includes maneuvering to a position that protects the marine life 404 from environmental elements. For example, the marine life 404 may be located on certain portions of the structure 102. When positioned in the breakwater configuration, the portions of the structure 102 that include the marine life 404 may be located at a deeper depth compared to other portions of the structure 102. Positioning the marine life 404 at a deeper depth can improve protection of the marine life 404 from forces of wind and waves.

The autonomous submersible can include a housing for sensitive components. For example, the structure 102 includes a column 310. The column can extend along a length from a first end 412 to a second end 414. The column 310 can be, for example, an environmentally sealed component of the structure that houses sensitive components of the structure 102. In some implementations, the column 310 houses at least part of one or more of the control system 230, the maneuvering system 240, and the linking system. The control system 230, the maneuvering system 240, and the linking system can include sensors and electronics that are sensitive to water damage and must be kept dry in order to remain operable.

In some implementations, the column 310 can house the ballast tanks 248, the air tanks 246, or both. By operating the ballast tanks 248 and the air tanks 246 of the column 310, the structure can change configurations. For example, a ballast tank 411 at or near the first end 412 can be filled with an amount of water in order to increase the depth of the first end 412 compared to the depth of the second end. This can cause the structure 102 to rotate from a floating position in which the length of the column 310 extends in a direction approximately parallel to the water surface, as shown in the example structure 102a of FIG. 3A, to a partially submerged position in which the length of the column 310 extends approximately orthogonal to the water surface, as shown in the example structure 102a in FIG. 3B.

In some implementations, environmentally sealing the entirety of the column 310 might not be possible. In some implementations, a portion of the column 310 containing the most sensitive electronic components is kept above water at all times, while other portions of the column 310 can be submerged.

Figure 5:
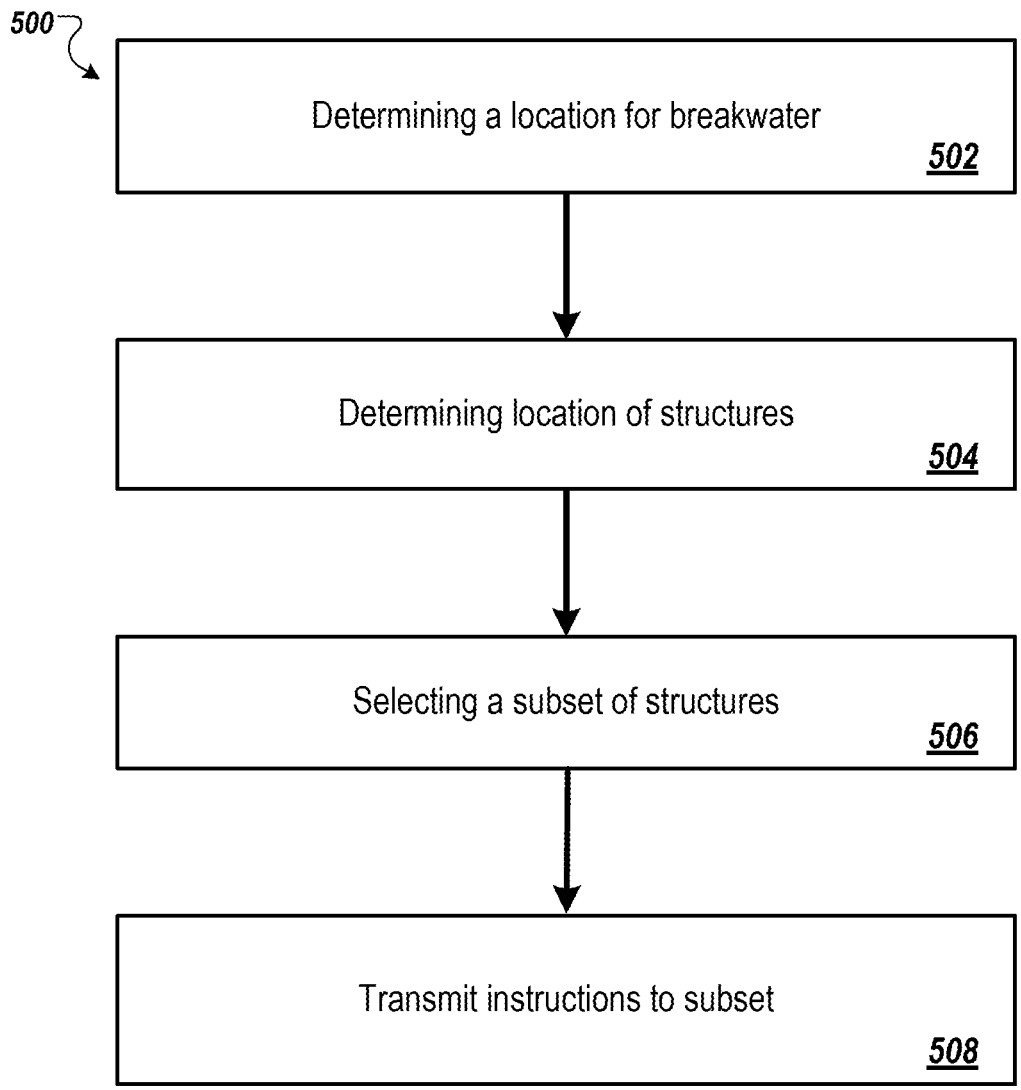
FIG. 5 is a diagram of an example control system of an autonomous submersible structure.

FIG. 5 is a flow diagram of an example process 500 for constructing an autonomous modular breakwater system. Briefly, the process 500 includes determining a location for a breakwater (502); determining locations of structures (504); selecting a subset of structures (506); and transmitting instructions to the subset (508).

In greater detail, the process 500 includes determining a location for a breakwater (502). For example, the controller 202 can determine a location for construction of the breakwater 110 based on predicted weather events, based on pre-programmed instructions, based on user input, etc.

The process 500 includes determining locations of structures (504). For example, the controller 202 can determine an initial location of each of a plurality of autonomous submersible structures, where each of the autonomous submersible structures is configured to mechanically link to any other of the plurality of autonomous submersible structures to form a breakwater. Each of the autonomous submersible structures 101,102 can include a wireless communication module for communicating with the controller 202. The controller 202 can receive, from each of the wireless communication modules, data indicating a geographic coordinate location of the structures 101,102. Each structure can include a linking system 260 for mechanically linking to any of the other structures to form a breakwater.

The process 500 includes selecting a subset of structures (506). For example, the controller 202 can select, based at least in part on the initial location of each of the plurality of autonomous submersible structures, a subset of the plurality of autonomous submersible structures for constructing the breakwater. For example, from the structures 101, 102, the controller 202 can select a subset of the structures. The subset may include the structures 102, and exclude the structure 101. The controller 202 can select the structures 102, for example, based on a proximity of each of the structures 102 to the determined location for construction of the breakwater 110.

The process 500 includes transmitting instructions to the subset (508). For example, the controller 202 can transmit, to each of the selected autonomous submersible structures, instructions to transit from the respective initial location to the location for construction of the breakwater and to mechanically couple to at least one other autonomous submersible structure to form the breakwater. The controller 202 can transmit, to the structure 102c, instructions to transit from the initial location of the structure 102 along path 107 to the determined location for construction of the breakwater 110. Upon arrival at the determined location, the instructions can cause the structure 102c to mechanically link to structure 102a, structure 102b, or both, to form the breakwater 110.

Figure 6:
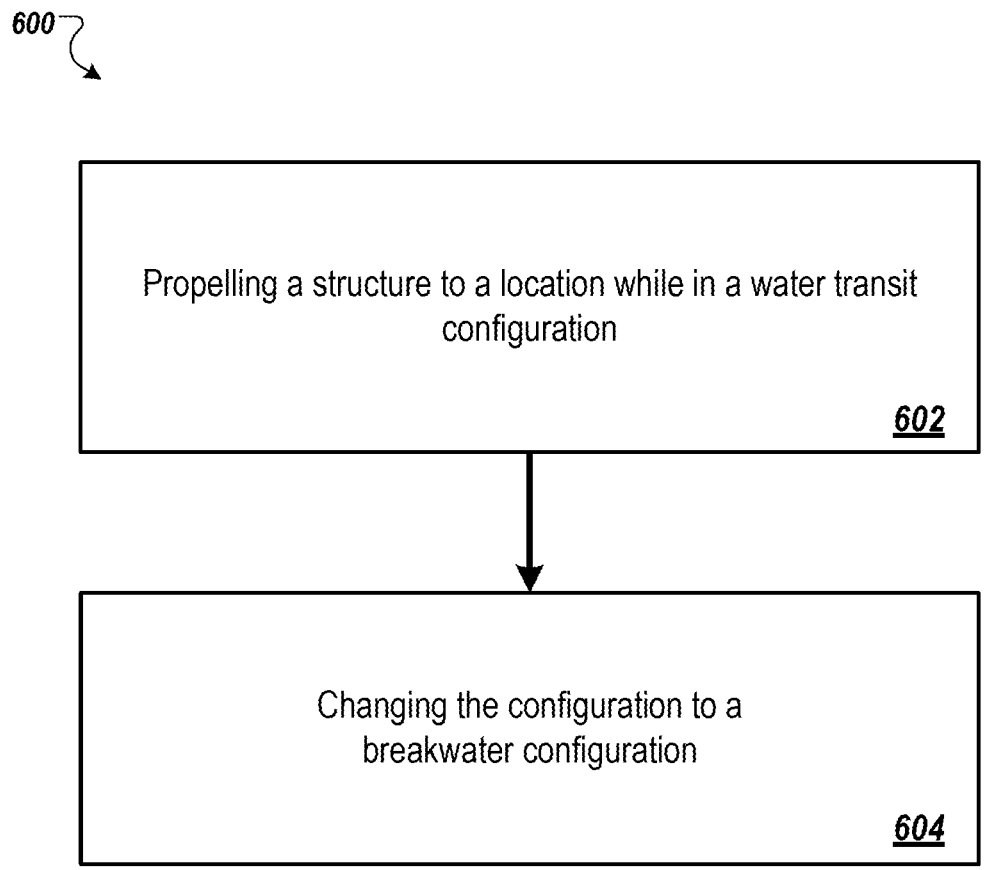
FIG. 6 is a flow diagram of an example process for constructing an autonomous modular breakwater system.

FIG. 6 is a flow diagram of an example process 600 for controlling a structure of an autonomous modular breakwater system. Briefly, the process 600 includes propelling a structure to a location while in a water transit configuration (602) and changing the configuration to a breakwater configuration (604).

In greater detail, the process 600 includes a structure to a location while in a water transit configuration (602). For example, the control system 230 of the structure 102a can control the maneuvering system 240 to operate engines 242 and propellers 244 to propel the structure 102 to a determined location. While transiting to the determined location, the structure 102 can be in a water transit configuration that includes, e.g., a floating position, a partially submerged position, or a submerged position.

The process 600 includes changing the configuration to a breakwater configuration (604). For example, when the structure 102a arrives at the determined location, the control system 230 can control the maneuvering system 240 to operate propellers 244, air tanks 246, ballast tanks 248, or any combination of these to change the configuration of the structure to the breakwater configuration. The breakwater configuration can include a position in which the structure 102 is configured to attenuate incident waves.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A system comprising:
a plurality of autonomous submersible structures, wherein each of the autonomous submersible structures is configured to mechanically couple to any other of the plurality of autonomous submersible structures to form a breakwater; and
a controller comprising one or more processing devices configured to perform operations comprising:
determining a location for construction of the breakwater; and
transmitting instructions over a wireless network to each of the plurality of autonomous submersible structures, wherein the instructions cause a first autonomous submersible structure of the plurality of autonomous submersible structures to:
transit to the location for construction of the breakwater;
after transiting to the location for construction of the breakwater, autonomously align a first interlocking mechanism of the first autonomous submersible structure with a second interlocking mechanism of a second autonomous submersible structure; and
mechanically couple to the second autonomous submersible structure to form at least a portion of the breakwater, including coupling the first interlocking mechanism with the second interlocking mechanism.

2. The system of claim 1, the operations comprising:
receiving data indicating a predicted weather event; and
determining the location for construction of the breakwater based on the predicted weather event.

3. The system of claim 1, the operations including determining a size of the breakwater, and selecting a subset of the plurality of autonomous submersible structures for constructing the breakwater based at least in part on the size of the breakwater.

4. The system of claim 1, wherein each of the autonomous submersible structures includes a wireless communication module, the operations comprising:
receiving, from a first wireless communication module of the first autonomous submersible structure, data indicating an initial location of the first autonomous submersible structure, wherein the instructions cause the first autonomous submersible structure to transit from the initial location to the location for construction of the breakwater.

5. The system of claim 1, wherein each of the autonomous submersible structures includes a wireless communication module, the operations comprising:
transmitting the instructions to each of the autonomous submersible structures through the respective wireless communication modules.

6. The system of claim 1 wherein the breakwater comprises the plurality of autonomous submersible structures linked in an approximately linear configuration from an overhead perspective.

7. The system of claim 1, wherein the location for constructing the breakwater includes at least one of a cardinal angle of the breakwater, a distance of the breakwater from a shoreline, a geographic location of an endpoint of the breakwater, or a geographic location of a center point of the breakwater.

8. An autonomous submersible structure comprising:
a maneuvering system configured to propel the autonomous submersible structure and to configure the autonomous submersible structure in at least two configurations, the at least two configurations including:
a water transit configuration; and
a breakwater configuration;
a control system comprising one or more processing devices configured to perform operations comprising:
receiving instructions over a wireless network, the instructions indicating a location for construction of a breakwater; and
in response to receiving the instructions, controlling the maneuvering system to:
propel the autonomous submersible structure to cause the autonomous submersible structure to transit to the location for construction of the breakwater while the autonomous submersible structure is in the water transit configuration;
after transiting to the location for construction of the breakwater, change the configuration of the autonomous submersible structure from the water transit configuration to the breakwater configuration;
autonomously align a first interlocking mechanism of the autonomous submersible structure with a second interlocking mechanism of a second autonomous submersible structure; and
mechanically couple to the second autonomous submersible structure to form at least a portion of the breakwater, including coupling the first interlocking mechanism with the second interlocking mechanism.

9. The autonomous submersible structure of claim 8, wherein in the breakwater configuration, the autonomous submersible structure is configured to attenuate energy of waves incident on the autonomous submersible structure.

10. The autonomous submersible structure of claim 8, wherein:
the maneuvering system includes a ballast system configured to perform ballasting operations to increase depth of at least part of the autonomous submersible structure, and
changing the configuration from the water transit configuration to the breakwater configuration includes performing ballasting operations.

11. The autonomous submersible structure of claim 8, comprising an anchoring device, wherein changing the configuration from the water transit configuration to the breakwater configuration includes deploying the anchoring device.

12. The autonomous submersible structure of claim 8, comprising a linking system configured to couple the first interlocking mechanism of the autonomous submersible structure to the second interlocking mechanism of the second autonomous submersible structure.

13. The autonomous submersible structure of claim 12, the operations comprising:
receiving instructions to couple the first interlocking mechanism to the second interlocking mechanism of the second autonomous submersible structure.

14. The autonomous submersible structure of claim 12, comprising one or more sensors for detecting the second autonomous submersible structure and determining a relative position between the autonomous submersible structure and the second autonomous submersible structure.

15. The autonomous submersible structure of claim 8, wherein:
the instructions include navigation instructions; and
controlling the maneuvering system to propel the autonomous submersible structure to cause the autonomous submersible structure to transit to the location for construction of the breakwater comprises controlling the maneuvering system to navigate the autonomous submersible structure according to the navigation instructions.

16. The autonomous submersible structure of claim 15, wherein the navigation instructions include at least one of a geographic destination, navigation waypoints, a target time of arrival, or a target travel speed.

17. The autonomous submersible structure of claim 8, the operations comprising:
receiving data indicating a predicted weather event;
selecting a geographic destination for the autonomous submersible structure based on the predicted weather event; and
controlling the maneuvering system to:
propel the autonomous submersible structure to cause the autonomous submersible structure to transit to the selected geographic destination; and
change the configuration of the autonomous submersible structure from the water transit configuration to the breakwater configuration after arrival at the selected geographic destination.

18. The autonomous submersible structure of claim 8, wherein the at least two configurations include a floating configuration for growing marine life.

19. A computer-implemented method comprising:
determining, by a controller comprising one or more processing devices, a location for construction of a breakwater; and
transmitting, by the controller, instructions over a wireless network to each of a plurality of autonomous submersible structures, wherein:
each of the autonomous submersible structures is configured to mechanically couple to any other of the plurality of autonomous submersible structures to form the breakwater; and
the instructions cause a first autonomous submersible structure of the plurality of autonomous submersible structures to:
transit to the location for construction of the breakwater;
after transiting to the location for construction of the breakwater, autonomously align a first interlocking mechanism of the first autonomous submersible structure with a second interlocking mechanism of a second autonomous submersible structure; and
mechanically couple to the second autonomous submersible structure to form at least a portion of the breakwater, including coupling the first interlocking mechanism with the second interlocking mechanism.

* * * * *